United States Patent [19]

Bertin et al.

[11] Patent Number: 4,744,450

[45] Date of Patent: * May 17, 1988

[54] DEVICE FOR MAINTAINING A CLUTCH RELEASE BEARING IN CONTACT WITH A CLUTCH COVER ASSEMBLY AT ALL TIMES

[75] Inventors: Patrice Bertin, Mery-Sur-Oise; Rabah Arhab, Pierrefitte; Yvon Sevennec, Vernouillet, all of France

[73] Assignee: Valeo, Paris, France

[*] Notice: The portion of the term of this patent subsequent to Jun. 9, 2004 has been disclaimed.

[21] Appl. No.: 737,427

[22] Filed: May 24, 1985

[30] Foreign Application Priority Data

Mar. 28, 1984 [FR] France .................. 84 08324

[51] Int. Cl.[4] .............. F16D 12/75; F16D 23/12
[52] U.S. Cl. ............... 192/111 A; 192/82 P; 192/84 R; 192/99 S
[58] Field of Search .......... 192/99 S, 82 P, 111 A, 192/84 R, 70.25; 267/155; 188/196 B

[56] References Cited

U.S. PATENT DOCUMENTS

| | | | |
|---|---|---|---|
| 1,869,887 | 12/1929 | Dina ................... | 192/82 P |
| 2,632,421 | 3/1953 | Perkins ................. | 74/69 |
| 3,286,803 | 11/1966 | Zeidler ................. | 192/99 S |
| 3,621,959 | 11/1971 | Gale et al. ............. | 192/111 A |
| 4,154,119 | 5/1979 | Chapman ................ | 192/99 S |
| 4,227,603 | 10/1980 | Fasano ................. | 192/111 A |
| 4,263,999 | 4/1981 | Fasano ................. | 192/111 A |
| 4,299,134 | 11/1981 | Roy et al. .............. | 267/155 |
| 4,428,471 | 1/1984 | Parker et al. ........... | 192/99 S |
| 4,431,101 | 2/1984 | Limbacher ............. | 192/111 A |
| 4,650,056 | 3/1987 | Sevennec et al. ........ | 192/99 S X |
| 4,671,400 | 6/1987 | Grunberg et al. ........ | 192/99 S X |

FOREIGN PATENT DOCUMENTS

| | | |
|---|---|---|
| 1469915 | 2/1967 | France . |
| 2094619 | 2/1972 | France . |
| 2523743 | 9/1983 | France . |
| 1124421 | 8/1968 | United Kingdom . |
| 1124422 | 8/1968 | United Kingdom . |
| 1181920 | 2/1970 | United Kingdom . |
| 1411467 | 10/1975 | United Kingdom . |
| 2034854 | 6/1980 | United Kingdom . |
| 2117076 | 10/1983 | United Kingdom . |

Primary Examiner—Leslie A. Braun
Assistant Examiner—David A. Testardi
Attorney, Agent, or Firm—Charles E. Brown; Charles A. Brown

[57] ABSTRACT

A device for maintaining a clutch release bearing in contact with a clutch cover assembly at all times comprises a clutch release bearing operating shaft, a motorized actuator and coupling devices coupling the actuator to the shaft. These coupling devices incorporate a gear unit driven by the actuator and a toothed sector meshing with the gear unit and rotating freely on the shaft. The toothed sector cooperates with a lever fastened to the operating shaft through the intermediary of a thrust device which is implemented with play. An elastic device for presetting the force with which the clutch release bearing bears on the clutch cover assembly when the clutch is engaged, is disposed between the toothed sector and the lever and operates to increase the play of the thrust device.

7 Claims, 5 Drawing Sheets

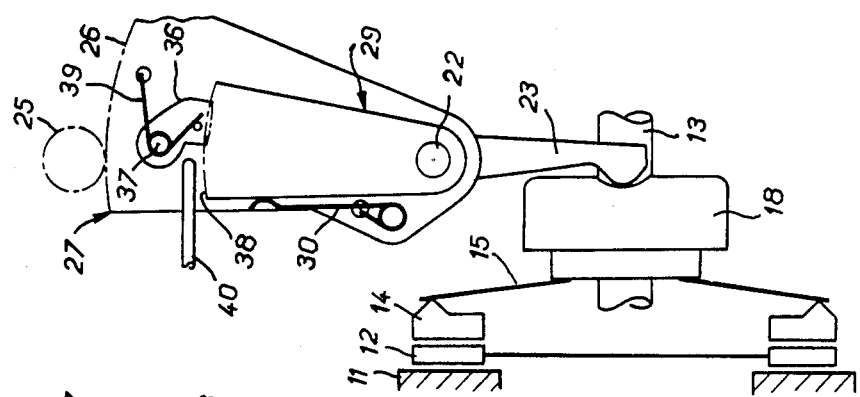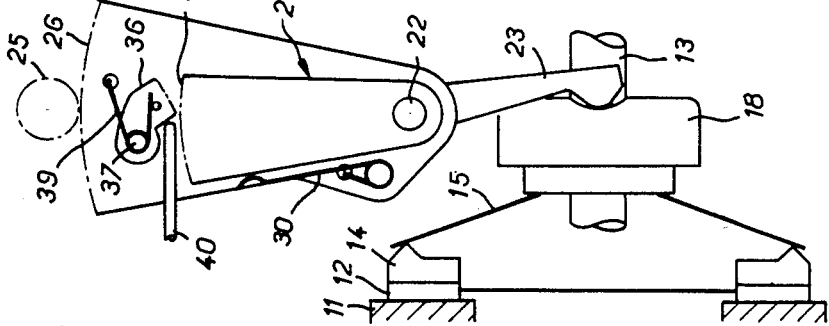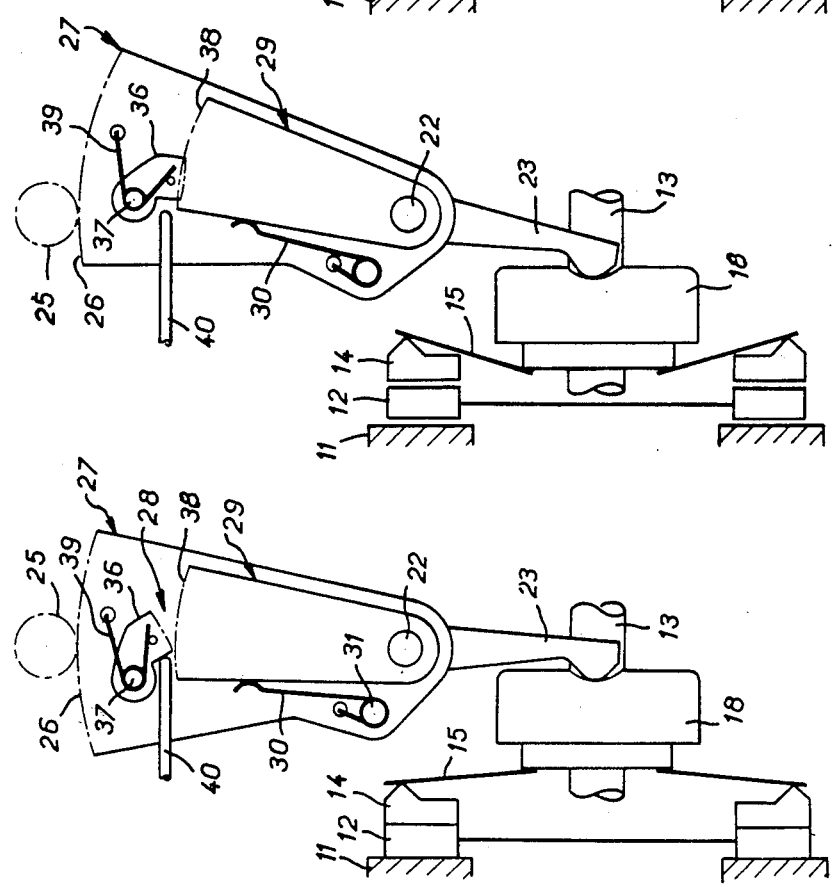

DEVICE FOR MAINTAINING A CLUTCH RELEASE BEARING IN CONTACT WITH A CLUTCH COVER ASSEMBLY AT ALL TIMES

BACKGROUND OF THE INVENTION

1. Field of the Invention

The present invention concerns a device for maintaining a clutch release bearing in contact with a clutch cover assembly at all times.

2. Description of the Prior Art

As is known, a clutch release bearing is actively operative on the clutch cover assembly at the time of the operation to disengage the clutch but is generally spaced from the assembly by a small distance, called the clearance, in the clutch engaged position. It has been noted that it is often advantageous to eliminate this clearance and to provide for the clutch release bearing to bear on the clutch cover assembly under all circumstances, including when the clutch is engaged, in order to procure gentler and more effective operation, with reduced wear of the various component parts of the clutch and the release bearing.

To this end, it has been proposed to associate a spring with the clutch release footpedal, to enable the clutch release bearing to be held against the clutch cover assembly at all times.

When the release bearing is power-operated, however, mere transposition of the continuous contact means employed with a manual control system cannot be used.

The present invention is more particularly concerned with a device for maintaining a clutch release bearing in contact with a clutch cover assembly at all times when the release bearing is power-operated, the operating system comprising an actuator and coupling means between the actuator and a release bearing operating shaft, the coupling means comprising gear means driven from the actuator and meshing with a toothed sector associated with the operating shaft.

An object of the present invention is a device of the aforementioned kind which operates excellently under all circumstances, without excessive fatigue affecting the various parts which constitute it, and of simple and rugged construction.

SUMMARY OF THE INVENTION

The present invention consists in a device for maintaining a clutch release bearing in contact with a clutch cover assembly at all times, comprising a clutch release bearing operating shaft, an actuator, means coupling said actuator to said clutch release bearing operating shaft including gear means driven by said actuator and a toothed sector meshing with said gear means rotating freely on said operating shaft, a lever fast with said operating shaft, thrust means implemented with play through the intermediary of which said toothed sector cooperates with said lever, and elastic means for presetting the force with which said clutch release bearing bears on said clutch cover assembly when the clutch is engaged disposed between said toothed sector and said lever to increase said play of said thrust means.

By virtue of this arrangement, the travel of the elastic means is reduced and significantly shorter than the release travel, conferring excellent endurance on the elastic means. In particular, these means may in this way be conveniently incorporated into the power-operated device for releasing the clutch.

For preference, the toothed sector comprises a peg and the elastic means comprise a torsion spring wound round said peg with respective ends cooperating with the toothed sector and the lever. In this way a rugged and compact structure is obtained.

In one embodiment, the thrust means comprise a projection on the toothed sector and the lever comprises a bearing surface on which the projection bears.

In an alternative arrangement, the thrust means implemented with clearance advantageously comprise a pawl for compensating wear pivoted to the toothed sector and the lever comprises a toothed portion with which the pawl cooperates. A spring is preferably provided to hold the pawl engaged with the toothed portion of the lever and a fixed bearing surface raises the pawl when the clutch is engaged, against the action of the aforementioned spring, so as not only to activate the elastic means but also to compensate for wear.

It will be appreciated that a structure of this kind enables continuous contact to be achieved and wear to be compensated in an extremely simple manner.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIGS. 7, 8, 9 and 10 show the operation of the device in FIG. 5, FIG. 7 showing the clutch when new and engaged, FIG. 8 showing the clutch when new and disengaged, FIG. 9 showing the clutch when worn and engaged and FIG. 10 showing the clutch when worn and disengaged.

DESCRIPTION OF THE PREFERRED EMBODIMENTS

Figure 1:
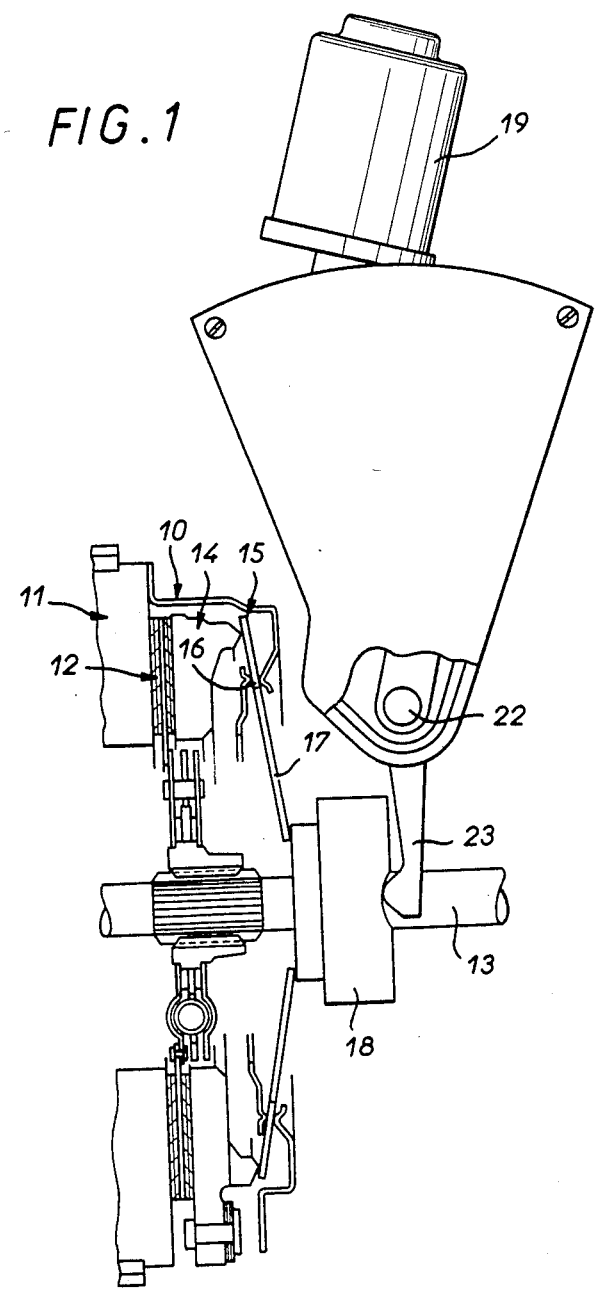
FIG. 1 a schematic view showing a clutch, its clutch release bearing and the power-driven operating system for the clutch release bearing with a device in accordance with the invention for maintaining the clutch release bearing in contact with the clutch cover assembly at all times.

The embodiment shown in FIGS. 1 through 4 illustrates, by way of non-limiting example, an application of the invention to the operation of a diaphragm clutch, in particular for automobile vehicles.

The clutch (FIG. 1) comprises a cover 10 adapted to be fastened to the flywheel 11 of the motor of the automobile vehicle. This flywheel 11 constitutes a reaction plate. The clutch further comprises a friction disk 12 which is coupled to the primary shaft 13 of the gearbox of the automobile vehicle. The disk 12 is adapted to be clamped between the reaction plate 11 and a pressure plate 14, as a result of an elastic clamping force applied by a diaphragm-shaped spring 15.

The diaphragm spring 15 bears on the cover 10 at 16 and features in its central region fingers 17 adapted to be pushed towards the left in FIG. 1 by a clutch release bearing 18 when it is required to alter the clutch from the engaged state shown in FIG. 1, in which the release bearing 18 has no significant effect on the diaphragm spring 15, to a disengaged state in which the release bearing 18, by pushing on the diaphragm spring 15, removes the clamping force from the pressure plate 14, which releases the friction disk 12.

Figure 2:
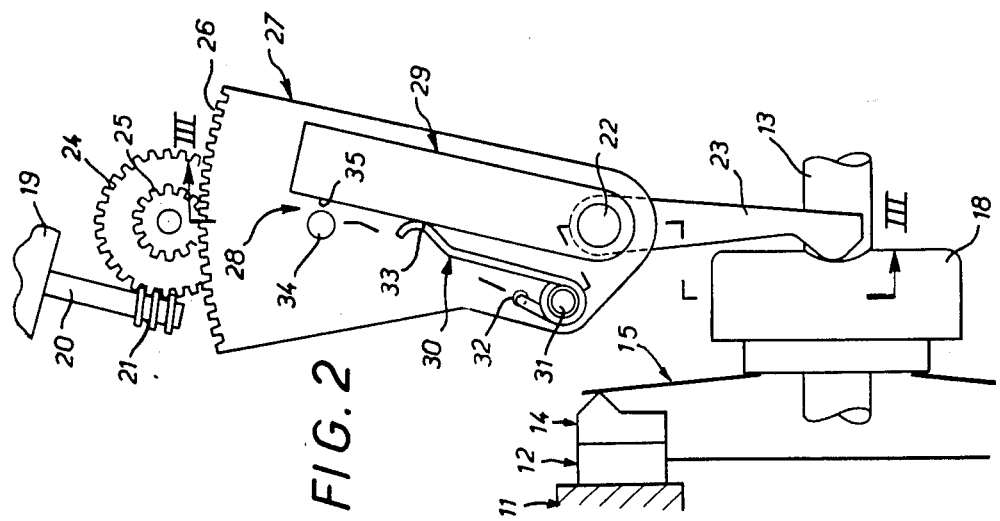
FIG. 2 is a view to a larger scale of the clutch release bearing operating system and the contact maintaining device, shown in the clutch engaged position.
Figure 6:
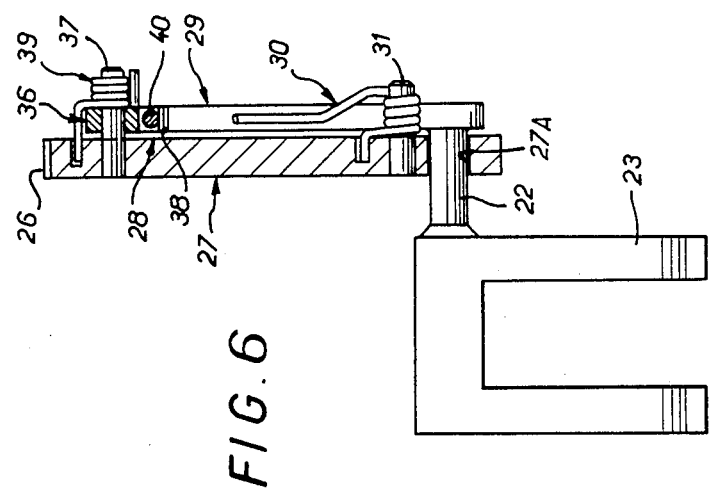
FIG. 6 is a corresponding view in cross-section on the broken line VI—VI in FIG. 5.
Figure 5:
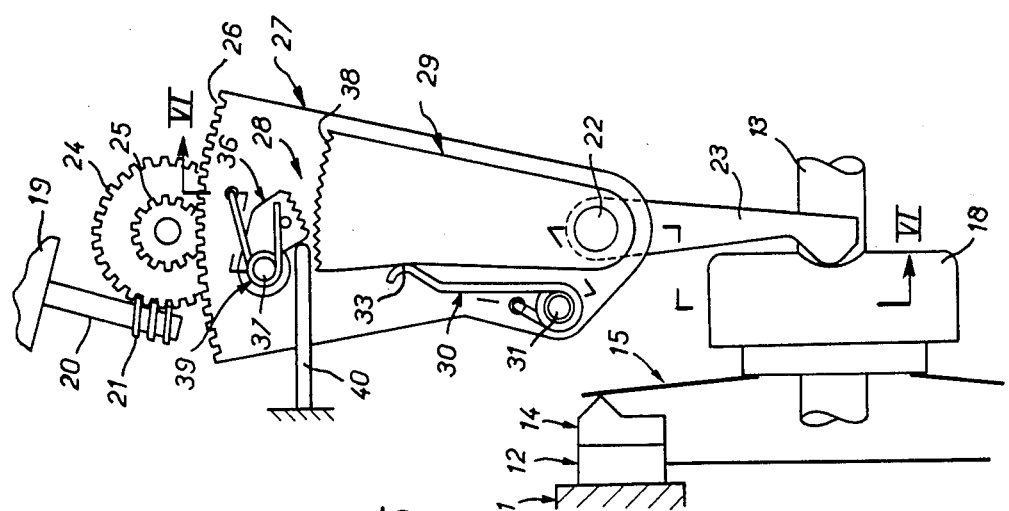
FIG. 5 is a view analogous to FIG. 2 but in which the continuous contact maintaining device is combined with a wear compensator.

The operating system for the release bearing 18 is power-driven and comprises an actuator 19 (FIG. 1), an electric motor in this instance, the shaft 20 of which has one end formed as a lead screw 21 (FIG. 2).

The operating system for the release bearing 18 also comprises an operating shaft 22 and a yoke 23 which is fast with this shaft 22.

The operating system for the release bearing 18 further comprises coupling means between the lead screw 21 and the operating shaft 22. These coupling means comprise gear means formed, in the example shown, by two gear wheels 24 and 25 fastened together. The gear wheel 24 meshes with the lead screw 21 so as to be driven by the motor 19 and the gear wheel 25 meshes with the teeth 26 of a toothed sector 27.

Figure 3:
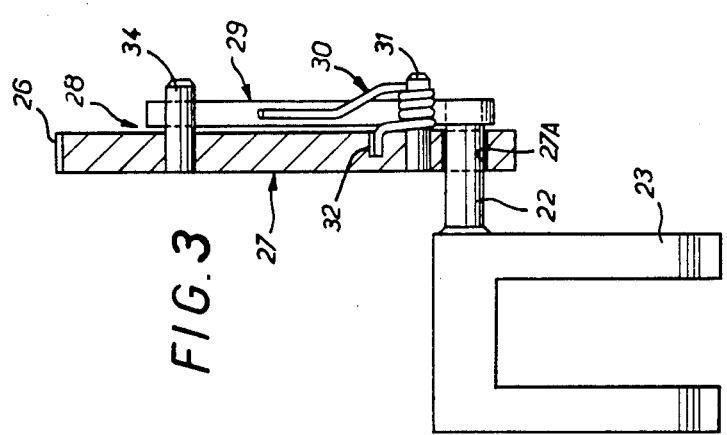
FIG. 3 is a corresponding view in cross-section on the broken line III—III in FIG. 2.

This toothed sector 27 associated with the operating shaft 22 is mounted to rotate freely about the shaft 22 at 27A (FIG. 3).

The toothed sector 27 cooperates with a lever 29 through thrust means 28 implemented with play. The lever 29 is fast with the operating shaft 22. Elastic means 30 are provided for presetting the force with which the clutch release bearing 18 bears on the clutch cover assembly in the clutch engaged position and are inserted between the toothed sector 27 and the lever 29, being operative in the direction which tends to increase the play of the thrust means 28.

In the example shown in FIGS. 1 through 4, these elastic means comprise a torsion spring 30 which is wound round a peg 31 on the toothed sector 27 and the respective ends 32 and 33 of which cooperate with the toothed sector 27 and the lever 29.

More specifically, in the example of FIGS. 1 through 4, the thrust means 28 implemented with play comprise a projection 34 on the toothed sector 27 adapted to bear on a bearing surface 35 on the lever 29.

In operation, in the position with the clutch engaged (FIGS. 1 through 4), when the motor 19 occupies the position shown in FIGS. 1 and 2, the projection 34 is slightly spaced from the bearing surface 35 and the lever 29, through the intermediary of the operating shaft 22, the yoke 23 and the release bearing 18, bears lightly on the diaphragm spring 15 due to the preset weak thrust of the spring 30, which maintains the contact between the yoke 23 and the release bearing 18.

Figure 4:
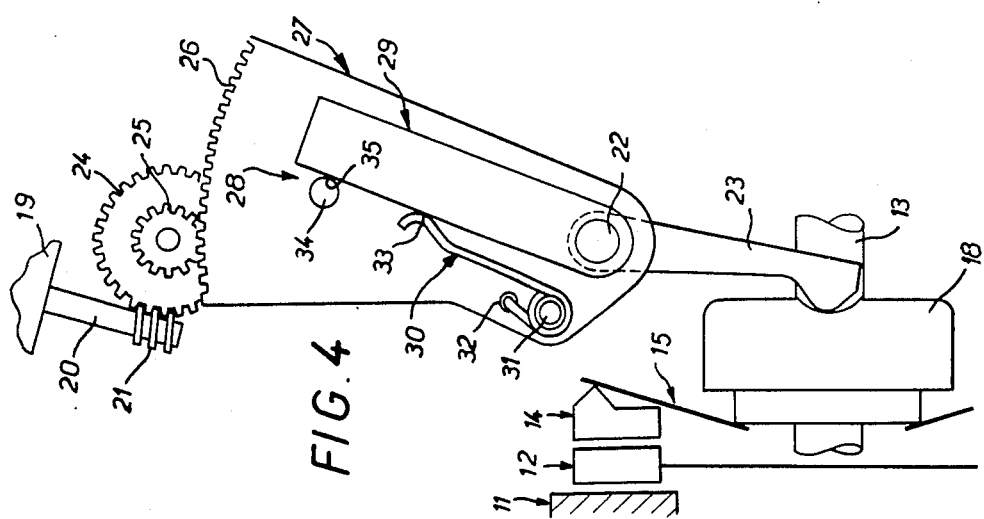
FIG. 4 is a view analogous to FIG. 2 but in the clutch disengaged position.

To release the clutch the motor 19 rotates in the direction which moves the toothed sector 27 from the position of FIG. 2 to that of FIG. 4. During this movement, the projection 34 first of all comes into contact with the bearing surface 35 on the toothed sector 27, which positively entrains the lever 29, the operating shaft 22 and the yoke 23 in the clockwise direction as seen in FIG. 4. There results a high thrust force on the release bearing 18 which overcomes the elastic resistance of the diaphragm spring 15, which releases the disk 12, as seen in FIG. 4.

To re-engage the clutch, the maneuver is carried out just as easily but in the opposite direction.

It will be understood that whether the clutch cover assembly is in the engaged or disengaged configuration, the device comprising the thrust means 28 implemented with play and the spring 30 maintains the clutch release bearing 18 in contact with the diaphragm spring 15 of the clutch cover assembly at all times, with a simple and rugged construction particularly well suited to power-driven operation of the release bearing 18.

It will be appreciated that the spring 30 is of small overall dimensions and has a small working range since this corresponds only to the play 28, which is very small. Consequently the spring 30 is not subject to wear and features excellent endurance throughout the service life of the device.

An alternative arrangement (FIGS. 5 through 10) is analogous to that which as just been described with reference to FIGS. 1 through 4 and the same reference numbers have been used in both cases, but the thrust means 28 implemented with play in this instance comprise a wear compensating pawl 36 which is pivotally mounted on the toothed sector 27 at 37 and which cooperates with teeth 38 formed on the lever 29.

A spring 39 maintains the pawl 36 engaged with the teeth 38 on the lever 29.

The pawl 36 is raised by a fixed bearing surface 40 in the clutch engaged configuration of the clutch cover assembly not only to activate the continuous contact elastic means but also to compensate for wear.

FIG. 7 shows the position of the device when the clutch is new and in the engaged configuration. The pawl 36 is raised by the fixed bearing surface 40 and the spring 30 exerts an elastic force which maintains the release bearing 18 in contact with the diaphragm spring 15 at all times.

FIG. 8 shows the clutch when new but in the disengaged configuration. In this case the pawl 36 has left the fixed bearing surface 40 and is engaged with the teeth 38 on the lever 29. Thus the toothed sector 27 and the lever 29 form an integral unit which operates on the release bearing 18 to achieve disengagement.

In FIG. 9 the clutch is shown in the engaged configuration, as in FIG. 7, but is in the worn rather than the new state. The operation is the same. However, the position of the pawl 36 relative to the teeth 38 on the lever is shifted towards the right in FIG. 9 as compared with the position in FIG. 7.

In FIG. 10 the clutch in the worn state is shown in the disengaged configuration and the operation is analogous to that which has been described with reference to FIG. 8. The sector 27 and the lever 29 form a block which operates on the release bearing 18 to disengage the clutch.

Figure 11:
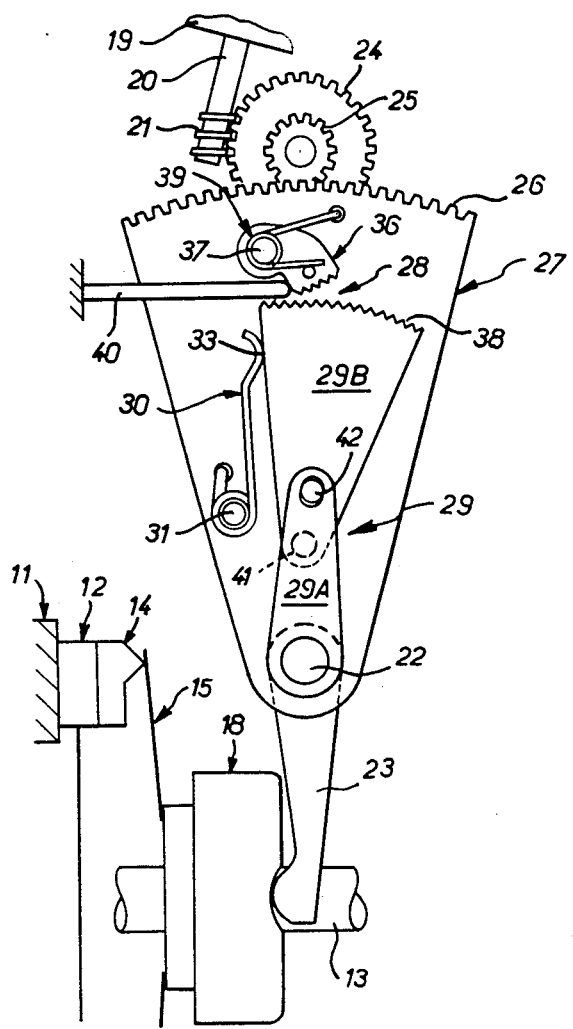
FIG. 11 relates to an alternative embodiment.

Another arrangement (FIG. 11) is analogous to that which has just been described with reference to FIGS. 5 through 10, but the lever 29 is in two parts 29A and 29B of which one 29A is fastened to the operating shaft 22 and the other 29B carries the teeth 38. The two parts 29A and 29B are linked together by two joints one of which 41 is without play and the other of which 42 features radial play, so that the range of movement of the part 29B is greater than that of the part 29A.

The spring 30 cooperates with the part-lever 29B having the greater range of movement, which provides for a very high degree of precision in operation.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. A clutch actuating assembly operating a release device of a biased-engaged clutch cover assembly through a clutch release bearing, said biased-engaged clutch cover assembly includes resilient means acting to engage said clutch, said clutch actuating assembly comprising a motorized actuator, gear means driven by said actuator, a sector gear meshing with said gear means and freely rotatable about an operating shaft, a lever means fast with said operating shaft and cooperable with the clutch release bearing, thrust transmitting means operatively disposed between said sector gear and said lever means for coupling said lever means to said sector gear in a thrust transmitting mode for clutch disengagement and uncoupling said lever means and sector gear in the clutch engaged position, elastic means operatively connected between said sector gear and said lever means for biasing said thrust transmitting means to an uncoupled position when the associated clutch is engaged and for preloading said lever means to ensure constant contact between the clutch release bearing and the release device of the clutch cover assembly when the associated clutch cover assembly is engaged, said elastic means acting in a direction opposing an engaging force of said resilient means of the cover assembly.

2. A clutch actuating assembly according to claim 1, wherein said sector gear has a peg projecting axially therefrom, said elastic means comprising a torsion spring wound around said peg, said torsion spring having respective ends cooperating with said sector gear and said lever means.

3. A clutch actuating assembly according to claim 1, wherein said thrust transmitting means comprise an axial projection on said sector gear and a bearing surface on said lever cooperable with said axial projection.

4. A clutch actuating assembly according to claim 1, wherein said lever means has ratchet teeth formed on said lever means, said thrust transmitting means also defines means for compensating for wear in an associated clutch plate, and said thrust transmitting means comprises a pawl pivoted on said sector gear and cooperable with said ratchet teeth formed on said lever means.

5. A clutch actuating assembly according to claim 4, wherein said pawl is biased toward engagement with said ratchet teeth further and comprising means for disengaging said pawl and ratchet teeth for an uncoupled position of the thrust transmitting means.

6. A clutch actuating assembly according to claim 5, wherein said means for disengaging said pawl and ratchet teeth comprises a fixed bearing surface for raising said pawl out of engagement with said ratchet teeth.

7. A clutch actuating assembly according to claim 1, where said lever means comprises a first lever member fixed for rotation with said operating shaft and a second lever member cooperable with said thrust transmitting means and said elastic means, said second lever member having a pinned connection with said sector gear and said second lever memeber having a pin and slot connection with said first lever member on the side of said operating shaft remote from the clutch release bearing for amplifying movement of said first lever member.

* * * * *